United States Patent [19]

Wright

[11] 3,873,926

[45] Mar. 25, 1975

[54] AUDIO FREQUENCY SQUELCH SYSTEM

[75] Inventor: Larry R. Wright, Glenview, Ill.

[73] Assignee: Motorola, Inc., Chicago, Ill.

[22] Filed: May 3, 1974

[21] Appl. No.: 466,594

[52] U.S. Cl. .............................. 325/478, 179/1 VC

[51] Int. Cl. .............................................. H04b 1/10

[58] Field of Search ........... 325/323, 371, 377, 473, 325/348, 402, 456, 478, 313, 50, 330, 65; 179/1 P, 1 VL, 1 SW; 330/51; 178/DIG. 12

[56] References Cited

UNITED STATES PATENTS

| | | | |
|---|---|---|---|
| 3,102,236 | 8/1963 | Eichenberger et al. | 325/478 |
| 3,213,372 | 10/1965 | Kurvits | 325/478 |
| 3,325,738 | 6/1967 | Busby et al. | 325/478 |
| 3,350,650 | 10/1967 | Kemper | 325/478 |
| 3,603,884 | 9/1971 | Zaura, Jr. | 325/348 |
| 3,843,928 | 10/1974 | Nishimura et al. | 325/348 |

*Primary Examiner*—Benedict V. Safourek
*Assistant Examiner*—Jin F. Ng
*Attorney, Agent, or Firm*—Eugene A. Parsons; Vincent J. Rauner

[57] ABSTRACT

The audio frequency squelch system selects signals in the upper and lower portions of the voice frequency range and processes these signals separately. The signals are limited and then differentiated to produce pulses which trigger a monostable multivibrator, with variations in the duty cycle of the output pulses which occur at a voice syllabic rate (under 3.25 hertz) being selected. The selected signals from the two channels which are above a particular frequency (0.2 hertz) are summed by passing the signals from one channel through a phase shift circuit and applying the signals from the two channels to a difference amplifier. The difference signals which exceed a predetermined amplitude are detected and applied to a timing circuit which controls the squelch switch of a radio receiver. A hysteresis feedback circuit from the timing circuit to the detector reduces the threshold level of the detector when a signal has been detected. The utilization of responses from the two channels provides responses from both low frequency and high frequency voice signals so that a relatively large number of detections are obtained and the time constants of the squelch circuit can be relatively low for fast response.

12 Claims, 2 Drawing Figures

AUDIO FREQUENCY SQUELCH SYSTEM

REFERENCE TO A RELATED APPLICATION

This application is related to application Ser. No. 449,119 filed Mar. 7, 1974 by Bruce C. Eastmond. This application is directed to a squelch system which is similar to the system described in the prior application and which provides improved operation in certain applications.

BACKGROUND OF THE INVENTION

It has been found to be necessary for satisfactory operation of communication receivers to provide a squelch circuit which automatically mutes the receiver when no signal is being received. Such squelch circuits are common in frequency modulation communication receivers, in which receivers carrier information is available and is commonly utilized to provide the squelch operation. It is also desirable in single sideband communications receivers to prevent the reproduction of noise which is picked up and/or develped by the receiver when no signal is present. However, since the carries information cannot be utilized in a single sideband receiver, the squelch action must be derived in a different way.

Various type of squelch systems have been proposed for use in single sideband receivers, but such systems have not been entirely satisfactory for receivers operating in the range from 2 to 30 megahertz where diurnal variations occur in the ambient atmospheric noise levels, and high impulse noise levels are prevalent. Squelch circuits which derive the signal from automatic gain control circuits of the receivers are subject to falsing under such conditions. Other circuits which have been used have been unduly complex and have been critical of adjustment in order to satisfactorily reject variations in ambient atomospheric noise and to reject impulse noise.

SUMMARY OF THE INVENTION

It is an object of the present invention to provide an improved squelch circuit for use with single sideband communication receivers.

A further object of the invention is to provide a squelch circuit operating from the detected audio frequency output of the receiver, and which responds to variations in frequency at a voice syllabic rate.

Another object of the invention is to provide a squelch circuit operating from the detected audio signal of a receiver and which has channels responsive to two frequency ranges of the signal, with the responses to the two channels being summed to increase the number of responses indicating the presence of a voice signal.

The squelch circuit of the invention includes first and second filters for separately passing the lower and upper portions of the voice frequency range, and separate signal processing circuits coupled to each of the filters. The signal processing circuits limit the received signal and the limited signal is applied to a differentiator to produce pulses at the zero crossings of the signal which trigger a monostable multivibrator. The output of the monostable multivibrator is passed through an active low pass filter having a cutoff frequency of the order of 3.25 hertz, so that variations in the duty cycle of the pulses produced by the monostable multivibrator which have a voice syllabic rate are selected. The signals from the two processing circuits produced by the higher and lower frequencies in the received signal, and which vary at a frequency above 0.2 hertz, are summed by reversing the phase of one signal and applying the two signals to a difference amplifier. The difference signal is applied to a threshold detector and peaks above a predetermined value produce output signals which initiate operation of a timing circuit which controls the squelch switch. Feedback is provided from the timing circuit to the threshold detector to reduce the threshold level when a detected signal having a predetermined duration is received. The system with two channels has the advantage that more indications of voice syllables are detected, and that the high frequency audio will not affect the low frequency channel and the low frequency audio will not affect the high frequency channel. Since more detections are produced, the time interval between detections is short and the switching time constants can be shortened to provide rapid squelch operation.

BRIEF DESCRIPTION OF THE DRAWIGS

FIG. 1 is a block diagram of a receiver including the squelch system of the invention; and FIG. 2 is a circuit diagram of the squelch circuit.

DETAILED DESCRIPTION

Figure 1:
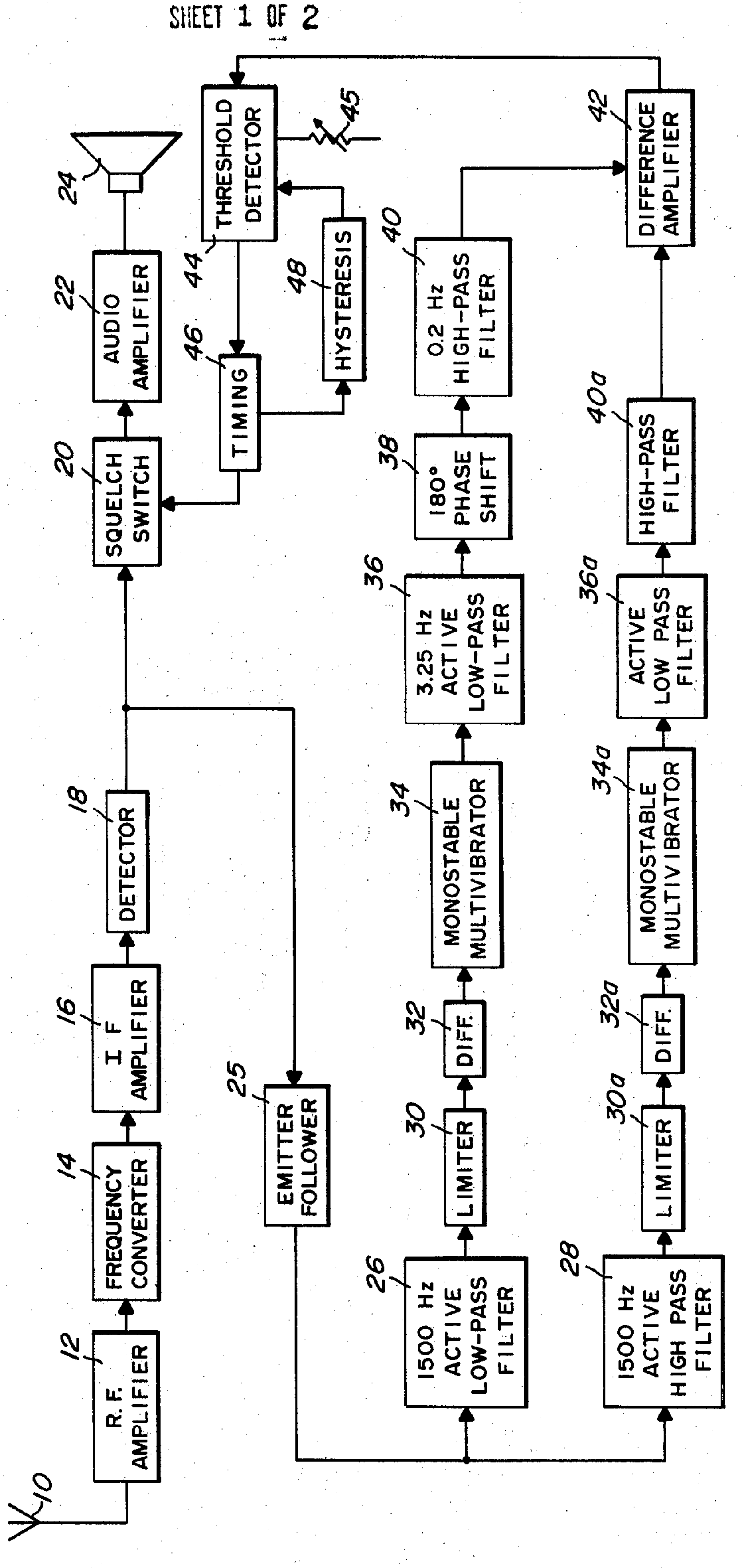

In FIG. 1 there is illustrated a radio receiver, which may be a single sideband receiver, which incorporates the squelch system of the invention. Signals picked up by an antenna 10 are amplified in radio frequency amplifier 12. Th signals are reduced to intermediate frequency by frequency converter 14 which may include one or more stages of frequency conversion. The intermediate frequency signals are amplified in amplifier 16, and the modulation signals are derived by detector 18. The detected signals, which may be voice signals, are applied through squelch switch 20 to audio amplifier 22. The amplified signals are reproduced in a suitable device, which may be a loudspeaker 24.

For providing squelch action, the audio signals are applied through emitter follower circuit 25 to two active filters 26 and 28. The filter 26 is a low pass filter which passes signals under 1,500 Hz, and filter 28 is a high pass filter which passes signals over 1,500 Hz. The audio frequency band of the receiver may be from 300 to 3,000 Hz so that, in effect, the filter 26 passes signals from 300 to 1,500 Hz, and the filter 28 passes signals from 1,500 to 3,000 Hz. The signals from each filter are applied to a processing circuit including a limiter 30, a differentiator circuit 32 and a monostable multivibrator 34. The limiter 30 is designed to cause preemphases of frequencies up to 1,500 Hz, so that there is a roll-off of the audio response below this frequency. The differentiator 32 produces a pulse at each zero crossing of the limited wave to trigger the monostable multivibrator. The monostable multivibrator produces pulses having lengths such that the duty cycle of the output pulse wave is approximately 90 percent at the highest frequency of interest in the audio signal applied thereto. The pulse wave from the monostable multivibrator 34 is applied to an active low pass filter 36, which passes signals below 3.25 Hz. Accordingly, variations in the duty cycle of the wave a a voice syllabic rate appear at the output of filter 36.

signals from the active low pass filter 36 of the processing circuit connected to filer 26 are applied through phase shift circuit 38 which applies a 180° phase shift to the signals. The phase shifted signals are applied to high pass filter 40 which rejects signals varyng slowly in frequency, and which contain no useful information.

The limiter, differentiator, monostable multivibrator and active low pass filter of the processing circuits connected to the active low pass filger 26 and to the active high pass filter 28 may be identical. The elements connected to the high pass filter 28 are given numerals 30A, 32A 34A and 36A to distinguish the same from the corresponding elements in th channel connected to the active low pass filter 26. The output of low pass filter 36A is applied to high pass filter 40A, which passes frequencies above 0.2 Hz.

The outputs of the two high pass filters 40 and 40A are applied to difference amplifier 42. The difference amplifier will provide an output when the signal from high pass filter 40 is greater than that from high pass filter 40A, and also when the signal from high pass filter 40A is greater than that from high pass filter 40. The outputs from the difference amplifier 40 are applied to threshold detector 44 has an adjustable threshold represented by the variable resistor 45. When the signal applied to the detector 44 exceeds the threshold which has been set, an output will be produced which is applied to the timing circuit 46. The timing circuit 46 controls the squelch switch 20, and when an input is applied to the timing circuit 46 for a predetermiend duration, the timing circuit will operate the squelch switch 20 so that the switch will open and allow the audio signal to be applied to the audio amplifier 22.

A hysteresis feedback circuit 48 is connected from the timing circuit 46 to the detector 44 to change the threshold of the detector when a signal is received. This ensures that the detector responds to reduced signals which may occur by fading in the received voice signal. The hysteresis circuit also provides a delay which shortens squelch openings due to noise falsing at very sensitive squelch setting.

Figure 2:
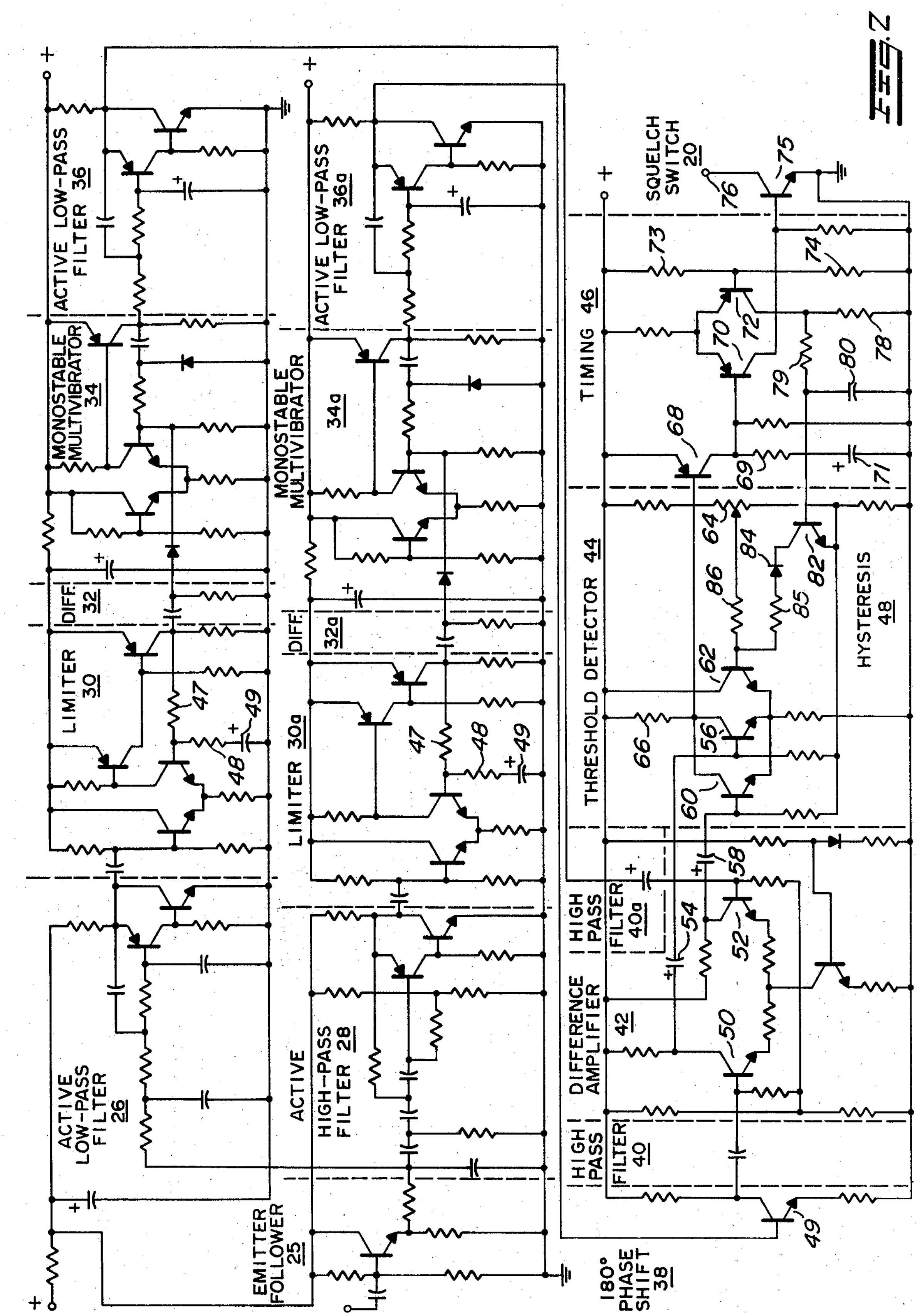

In FIG. 2 a circuit diagram is shown of the circuits which may be used to form the blocks shown in FIG. 1, with the circuits of blocks 25 and 46 being shown. The section of the circuit forming each block is indicated by dotted lines, and the sections are numbered to correspond to the blocks in FIG. 1. The specific circuits which form the blocks 26 and 40 and 28 to 40A will not be described as these elements can be provided by known circuitry, and the circuits shown in FIG. 2 are merely representative. It is pointed out, however, that the active filters 26 and 28 are of the three pole Butterworth type, with output transistors which provide a very low output impedance.

Limiters 30 and 30A each has a feedback circuit including resistors 47 and 48, and capacitor 49, which causes the limiter to provide pre-emphasis up to 1,500 Hz, so that the audio response of the limiter rolls off below this frequency and is substantially flat above 1,500 Hz. The roll off of the low frequencies by limiter 30 improves the squelch control action, and the correspoonding action of limiter 30A steepens the high pass action of the filter 28.

The monostable multivibtator 34 and 34A provide a constant width output pulse regardless of the trigger rate, provided that the trigger rate falls within the audio bandpass. The multivibrators each include a differential switch which controls the pulse width, so that the width is substantially independent of temperature.

The low pass filters 36 and 36A are of the two pole Chebyshev type, with the 3 dB corner frequencies being at about 3.25 Hz. These low pass filters control the response time of the squelch action, and the response time can easily be changed by changing the values of the input resistors. Although the use of higher corner frequencies will decrease the response time, this will increase the probability of noise falsing and will also reduce sensitivity.

The difference amplifier 42 is formed by transistors 50 and 52, with the signal passed by high pass filter 40 being applied to the base of transistor 50 and the signal from high pass filter 40A being applied to the base of transistor 52. It is pointed out that the signal applied to high pass filter 40 is received from transistor 49, which forms the phase shift circuit 38, to provide a 180° phase shift of the signal from the low pass channel. When the signal applied to transistor 50 exceeds the amplitude of the signal applied to transistor 52, transistor 50 will turn on and transistor 52 will turn off and the collector of transistor 52 will rise and provide a signal which is applied through capacitor 58 to the base of transistor 60. Similarly, when the input applied to transistor 52 is greater than the input applied to the transistor 50, transistor 50 will turn off and an output is applied from the collector of transistor 50 through capacitor 54 to the base of transistor 56.

The difference amplifier 42 will respond to both the negative and positive excursions of the signals applied thereto from both the high pass filter 40 and the filter 40A. When the signal from filger 40 is positive going to turn on transistor 50 and turn off transistor 52, the rise in potential at the collector of transistor 52 will be applied to the threshold detector, and when the signal from filter 40 is negative going to turn off transistor 50, the rise in potential at its collector will be applied to the threshold detector. Similarly, the difference amplifier 42 will respond to both positive and negative excursions of the input from the high pass filter 40A of the processing circuit which extends from the high pass filter 28.

The transistors 56, 60 and 62 together form the threshold detector 44 in the system shown in FIG. 1. The signals from difference amplifier 42 are applied to the base electrodes of transistors 56 and 60 which have their emitter electrodes connected together and to the emitter electrode of reference transistor 62. The base electrode of transistor 62 is connected to potentiomenter 64 which provides the threshold level for the detector, to control the squelch sensitivity. Transistor 62 is normally conducting, and turns off when a signal above the threshold is applied to one of transistors 56 and 60. The collector electrodes of transistors 56 and 60 are connected together and to load resistor 66 to provide the detector output. The threshold detector 44 will receive inputs from both channels, and these inputs are summed by the dector 44, and all such inputs produce signals across the load resistor 66. The threshold levle can be adjusted by changing the setting of the potentiometer 64.

The signals applied by each high pass filter to the difference amplifier 42 represents the frequency deviation of the audio signal in each from the mean frequency deviation of the audio signal in each from the mean frequency of the signal in such channel. The means frequency of the signals in each channel depends upon the frequency response of the channel and the frequency and nature of signals applied thereto, and will change as the applied signals change. In the channel extending from the 1,500 Hz low pass filter 26, the mean frequency has been found to be in the neighborhood of 1,000 Hz, and in the channel extending from the 1,500 Hz high pass filter, the mean frequency has been found to be in the neighborhood of 2,000 Hz. The threshold adjustment in effect controls the deviation in frequency of the applied audio signal from the means frequency which will operate the squelch. The pre-emphasis provided by the limiters 30 and 30A makes the system less responsive to an audio signal below 1,500 cycles, and such a signal will have to be stronger to capture the limiter and produce an output from the threshold detector 44.

The detector output is applied from the load resistor 66 to the input transistor 68 of the timing circuit 46. When the voltage applied to the base of transistor 56, or that applied to the base of transistor 60, is greater than the reference voltage applied to transistor 62, such transistor will conduct. The voltage drop thereby developed across load resistor 66 will cause input transistor 68 to conduct. Transistors 70 and 72 form a differential switch, and transistor 70 is normally on and transistor 72 is normally off, with bias being applied to its base by the voltage divider incuding resistors 73 and 74. Conduction of transistor 68 will reduce the bias voltage between the base and emitter of transistor 70 and act to turn off this transistor and turn on transistor 72. When transistor 70 turns off, the bias is removed from the base of transistor 75 to turn off this transistor which controls the squelch action.

Transistor 75 can be connected as a squelch switch to short or shunt the audio line. The collector of transistor 75 is connected to terminal 76, which may be connected to the audio line between the detector 18 and audio amplifier 22, to form the squelch circuit 20 (FIG. 1). Transistor 75 is normally conducting and can short the audio line, and when this transistor turns off the short is removed so that the audio signal from detector 18 is applied to the audio amplifier 22 (FIG. 1). Capacitor 71 connected in series with resistor 69 to the collector of transistor 68, and to the base of transistor 70, acts to delay the turn on of transistor 70. This allows the audio to remain on between pauses in the voice signal. As it takes a predetermined time (such as 200 milliseconds) to fully charge capacitor 71, the time that transistor 70 remains off varies with the time duration of a detected signal. When the detected signal occurs for a suficient time that the capacitor 71 is fully charged, and audio will remain on for a fixed time after the detected signal terminates, such as one second.

Transistor 75 can be used to control the squelch action in various other known ways. For example, this transistor can control the bias of the audio amplifier 22 of selectively render the amplifier conducting. The transistor 75 can also be connected to operate a series switch in the audio circuit to control the transmission of the audio signal from the detector 18 to the audio amplifier 22.

To cause the circuit to respond to reduced signals after a signal is detected, a hysteresis feedback circuit is provided. The collector elecrode of transistor 72 is connected to the reference potential (ground) by resistor 78, with transistor 72 conducting when transistor 70 is turned off so that a voltage is developed across resistor 78. This voltage is applied through resistor 79 to charge capacitor 80. The potentialacross capacitor 80 is applied to the base of transistor 82 to render the same conducting. This will complete a circuit through diode 84 and resistor 85 to reduce he threshold voltage applied to the base of transistor 62. This change in the threshold level, or hysteresis action, is delayed by the charging action of capacitor 80, both when a turn on voltage is provided by the detector 44 and when the voltage is removed. The diode 84 controls the amount of hysteresis at relatively sensitive settings of the squelch potentiometer 64, and the ratio of the values of resisotrs 85 and 86 controls the slope of the hystersis curve at tight settings of the squelch potentiometer. The hysteresis feedback circuit acts to reduce the threshold level so tha the detector provides an output voltage to hold the squelch open during fades in the voice or other audio signal. The delay in the hysteresis effect shortens and squelch openings due to noise falsing at very sensitive squelch settings.

The squelch circuit which has been described operates solely from the audio signal developed by the receiver and distinguishes audio signals from noise signals. The system responds to syllabic variations in voice signals and is controlled by the deviation of the frequency from the mean frequency which represents noise signals. The system will respond to a tone signal as the frequency of the tone will deviate from the mean frequency out of the low pass filters 36 and 36A of the two channels, but when the tone frequency is stabilized, the output from the tone will be a change in the direct current level which will not pass through the high pass filters 40 and 40A. Accordingly there will be a short duration response to a tone signal.

I claim:

1. A squelch circuit for controlling the transmission of audio signals in a given frequency range including in combination:

filter means for receiving the signal and having a first output for passing signals in the lower portion of the given frequency range and a second output for providing signals in the upper portion of the given frequency range, first and second outputs, respectively, and each including limiter means, differentiator means, monostable multivibrator means and low pass filter means coupled to each other in the order named, said low pass filter means having a bandwidth to pass signals varying at a voice syllabic rate, means for comparing signals from said first and second signal processing circuits which have a frequency above a predetermined value to produce resultant signals representing processing circuits, and detector means coupled to said comparing means for detecting peaks in the resultant signals which exceed a predetermined amplitude to produce a squelch control voltage.

2. The squelch circuit of claim 1 including squelch switch means connected to said detector means for controlling the transmission of the audio signals.

3. The squelch circuit of claim 2 including timing means coupling said detector means to said squelch switch means.

4. The squelch circuit of claim 3 wherein said timing means includes delay means for delaying the action of said squelch switch means to terminate transmission of audio signals upon termination of the squelch control voltage.

5. The squelch circuit of claim 3 including feedback means coupling said timing means to said detector means for reducing the threshold lelve of said detector means in response to a detected signal having a predetermined time duration.

6. The squelch circuit of claim 5 wherein said feedback means includes delay means to delay the action of said timing means on the threshold level.

7. The squelch circuit of claim 1 wherein said detector means includes adjustable means for setting the threshold level thereof, to thereby control the deviation of the frequency of an audio signal applied to the squelch circuit which produces squelch action.

8. The squelch circuit of claim 1 wherein said comparing means includes first and second high pass filter means connected to said first and second signal processing circuits for removing slow variations in frequency from the outputs thereof, means for reversing the phase of the signal from one of said signal processing circuits, and difference amplifier means coupled to said high pass filter means for producing signals representing the difference in the amplitudes of the signals from said first and second signal processing circuits.

9. The squelch circuit of claim 1 wherein said low pass filter means for each of said signal processing circuits includes an active low pass filter for passing signals below a frequency or the order of 3.25 Hz.

10. The squelch circuit of claim 1 wherein said comparing means includes a high pass filter for passing signals from said signal processing circuits which have a frequency above 0.2 Hz.

11. The squelch circuit of claim 1 wherein said filter means includes an active low pass filter of passing signals below a predetermined frequency of the order of 1,500 Hz and an active high pass filter means for passing signals above said predetermined frequency.

12. The squelch circuit of claim 11 wherein said limiter means of each of said signal processing circuits includes means for pre-emphasizing signals of frequencies up to the order of 1,500 Hz, with the response at higher frequencies being substantially flat, to thereby reduce the effect of signals below 1,500 Hz on the squelch action.

* * * * *